3,321,421
FLAME RETARDANT PARTICLE BOARD CONTAINING ACIDIFIED BORATE AND PROCESS FOR MAKING THE SAME
Antal (Anthony) Pataki, Shafi Ul Hossain, and William Patrick Johnson, all of Sault Sainte Marie, Ontario, Canada, assignors to Abitibi Power & Paper Company Limited, Sault Sainte Marie, Ontario, Canada, a corporation of Canada
No Drawing. Filed Dec. 2, 1963, Ser. No. 327,544
Claims priority, application Canada, Sept. 11, 1963, 884,275
12 Claims. (Cl. 260—17.3)

This invention relates to a method for making flame retardant particle board and to the product of such method.

Numerous flame-retardant chamicals, generally useful for the flame-retardant treatment of cellulosic and lignocellulosic materials are described in the literature, among which boric acid, sodium tetraborate, ammonium sulphate, ammonium sulphamate, ammonium phosphates, zinc chloride or their combinations, are perhaps the best known.

None of the chemicals commonly used for imparting flame retardance to ligno-cellulosic materials are entirely satisfactory for use in the field of particle board, as no suitable means compatibile with the process of particle board manufacture have been devised for the application of these chemicals.

In accordance with this invention it has been found that an aqueous solution of an alkali metal borate acidified with an inorganic acid provides a chemical system which permits the flame retardant treatment to be an integral part of the particle board manufacturing process. Alkaline earth metal borates may be used in substitution for part or all of the alkali metal borate.

The methods used for preparing flame-retardant particle boards in accordance with the present invention will be illustrated by the examples below. In these experiments, laboratory particle boards were prepared from wood flakes made from poplar aspen logs by means of a mechanical flaker. The flakes had a moisture content of 5%.

The synthetic resin used for the preparation of the boards was of the urea-formaldehyde type containing 60% resin solids (Monsanto UF-1014, manufactured by the Monsanto Chemical Company, Montreal, Quebec, Canada). The resin was used in an amount of 7% solids, based on the weight of the final board. The catalyst used was ammonium hydroxide, ammonium sulphate and water, in a ratio of 4:2:4 (by weight). Molten wax (Light Plasticrude, manufactured by the National Wax Company, Skokie, Ill., U.S.), in an amount of 2% of the weight of the board, was used in conjunction with the synthetic resin binder.

The flame-retardant properties of the particle board prepared in accordance with the examples described below were evaluated by submitting the boards to a modified version of the Schyler test with the following procedure being used.

Two specimen panels (9" x 30") were placed vertically in a suitable metal frame, with the surfaces to be tested held parallel and facing each other. The distance between the surfaces was two inches, and the bottom edge of one panel was situated four inches above the bottom edge of the other, for proper draught. A Bunsen burner fitted with a wing-tip and attached to a propane gas supply was used for the igniting flame. The burner was adjusted to produce a yellow flame and the gas flow was adjusted to approximately 2 cu. ft./hr. The ignition period was 10 min.

The height of the flame on the test panels was reduced at 1-min. intervals during the ignition period. The flame-spread (the criterion of flame retardance) was determined as the difference between the actual maximum flame height and a standard flame height. The standard flame height was obtained by performing the test using two asbestos panels in place of the test boards.

The perpendicular tensile strength of the flame-retardant particle board samples was determined according to the A.S.T.M. Designation D1037–60T method. (A.S.T.M. Standards 1961, Part 6, p. 801, Published by the American Society for Testing and Materials, Philadelphia, U.S.).

EXAMPLE I

A batch of 3320 g. of poplar aspen flakes was placed in a mechanical mixer. An aqueous solution, containing 65 g. of hydrochloric acid and 255 g. of sodium tetraborate (both on an anhydrous basis) in 1190 g. of water, at a temperature of 75° C., was sprayed onto the flakes. The flame-retardant composition had the mol. ratio (mole hydrochloric acid:mole sodium tetraborate) of 1.3, and the solution had a pH of 5.8, taken at a temperature of 75° C. The wet flakes were dried to 5% moisture content, at about 250° F. in a forced-air dryer. The dry flakes were then sprayed with 468 g. of the liquid synthetic resin, along with 26.5 g. of catalyst and 80 g. of molten wax. One board (22" x 24" x ¾") was made with the aforementioned furnish, by pressing in a steam heated hydraulic press. The press temperature was 300° F., initial pressure was 300 p.s.i., which was reduced to 125 p.s.i. at a specified time during pressing. Total press time was 7½ min. The finished boards were then conditioned for testing at 50% R.H. at 73° F.

EXAMPLE II

A batch of 3160 g. of flakes was treated according to the procedure outlined above, with 2000 g. of a flame-retardant composition containing 164 g. of anhydrous phosphoric acid and 276 g. of anhydrous sodium tetraborate. The flame-retardant composition had a mol. ratio (phosphoric acid:sodium tetraborate) of 1.2, and the solution had a pH of 5.8, taken at a temperature of 75° C. The treated flakes were further processed in accordance with the steps outlined in Example I.

EXAMPLE III

A batch of 3160 g. of flakes was treated according to the procedure outlined in Example I, with 1830 g. of a flame-retardant composition containing 152 g. of nitric acid and 288 g. of sodium tetraborate, on an anhydrous basis. The flame-retardant composition had a mol ratio (nitric acid:sodium tetraborate, on an anhydrous basis. The flame-retardant composition had a mol. ratio (nitric acid: sodium tetraborate) of 1.7, and the solution had a pH of 6.3, taken at a temperature of 75° C. The flakes were further processed in accordance with the steps outlined in Example I; except, that $5/16$ in. boards were made from this furnish, and the pressing time was shortened to 3½ min., which is generally used for the pressing of boards of $5/16$ in. thickness.

EXAMPLE IV

A batch of 3120 g. of flakes was treated according to the procedure outlined in Example I, with 1460 g. of a flame-retardant composition containing 150 g. of hydrochloric acid and 330 g. of sodium metaborate, both on an anhydrous basis. The flame-retardant composition had a mol. ratio (hydrochloric acid:sodium metaborate) of 1.6, and the solution had a pH of 5.8, taken at a temperature of 75° C. The flakes were then processed in accordance with the steps outlined in Example I.

The results of the evaluation of the flame-retardant properties of the particle boards are shown below in Tables I, II, and III.

TABLE I

| Serial No. | Treating Conditions | | | | Amount of Flame-Retardant Composition in Board (Weight percent) | Flamespread (Schlyter Test) (in.) | Nominal Thickness of Board (in.) | P.T.S.[3] (p.s.i.) |
|---|---|---|---|---|---|---|---|---|
| | Composition | Mol. Ratio,[1] Acid/Alkali Metal Borate | Concentration,[2] g./100 g. of Solution | pH of the Solution at Addition | | | | |
| 1 | Untreated Board | | | | | 50 | 3/4 | 103 |
| 2 | do | | | | | | 5/16 | 121 |
| 3 | HCl-$Na_2B_4O_7$ | 1.3 | 12 | 5.8 | 7 | 9 | 3/4 | 94 |
| 3 | HCl-$Na_2B_4O_7$ | 1.3 | 21 | 5.8 | 8 | 16 | 3/4 | 98 |
| 4 | HCl-$Na_2B_4O_7$ | 1.0 | 21 | 6.8 | 11 | 8 | 1/2 | 116 |
| 5 | $H_3PO_4$-$Na_2B_4O_7$ | 1.2 | 22 | 5.8 | 11 | 13 | 3/4 | 93 |
| 6 | $HNO_3$-$Na_2B_4O_7$ | 1.7 | 24 | 6.3 | 11 | 15 | 5/16 | 132 |
| 7 | HCl-$[NaBO_2]_2$ | 1.8 | 21 | 5.8 | 8 | 16 | 3/4 | 101 |
| 8 | HCl-$[NaBO_2]_2$ | 1.6 | 33 | 5.8 | 12 | 10 | 3/4 | 115 |

[1] The mol. ratios are quoted to the nearest first decimal number.
[2] The solution concentration and the amounts of flame-retardant chemical in the board are quoted to the nearest integer.
[3] The P.T.S. values refer to a particle board of 0.63 specific gravity.

TABLE II

| Serial No. | Conditions of Treatment | | | | Amount of Flame-Retardant Composition in Board (Weight percent) | Flamespread (Schlyter Test) (in.) |
|---|---|---|---|---|---|---|
| | Composition | Mol. Ratio, HCl/$Na_2B_4O_7$ | Concentration, g./100 g. of Solution | pH of the Solution at Addition | | |
| 1 | Untreated | | | | None | [1] 50 |
| 9 | HCl-$Na_2B_4O_7$ | 1.7 | 13 | 5.8 | 4 | 24 |
| 10 | HCl-$Na_2B_4O_7$ | 1.4 | 22 | 5.8 | 4 | 33 |
| 11 | HCl-$Na_2B_4O_7$ | 1.2 | 32 | 5.8 | 4 | 38 |
| 12 | HCl-$Na_2B_4O_7$ | 1.7 | 13 | 6.8 | 8 | 12 |
| 13 | HCl $Na_2B_4O_7$ | 1.3 | 12 | 6.8 | 8 | 11 |
| 14 | HCl $Na_2B_4O_7$ | 1.4 | 22 | 5.8 | 8 | 16 |
| 15 | HCl $Na_2B_4O_7$ | 1.3 | 21 | 6.3 | 7 | 14 |
| 16 | HCl-$Na_2B_4O_7$ | 1.2 | 32 | 5.8 | 8 | 30 |
| 17 | HCl-$Na_2B_4O_7$ | 1.3 | 31 | 5.3 | 8 | 28 |
| 18 | HCl-$Na_2B_4O_7$ | 1.3 | 22 | 5.8 | 11 | 8 |
| 19 | HCl $Na_2B_4O_7$ | 1.3 | 31 | 5.3 | 11 | 15 |

[1] The untreated particle board was ignited for only 5 min. instead of the usual 10 min., as the fire went out of control after this exposure to the igniting flame.

TABLE III

| Serial No. | Record Book No. | Conditions of Treatment | | | | Physical Properties of Board | | |
|---|---|---|---|---|---|---|---|---|
| | | Composition | Mol. Ratio, Acid/Alkali Metal Borate | Concentration[1] g./100 g. of Solution | pH of the Solution at Addition | Flame-Retardant[2] Classification | Nominal Thickness of Board (in.) | P.T.S.[3] (p.s.i.) |
| 20 | 576-197-7 | HCl-$Na_2B_4O_7$ | 0.9 | 31 | 6.8 | Good | 3/4 | 57 |
| 21 | 576-197-3 | HCl-$Na_2B_4O_7$ | 1.07 | 31 | 6.3 | do | 3/4 | 98 |
| 22 | 576-195-3 | HCl-$Na_2B_4O_7$ | 1.19 | 21 | 6.3 | do | 3/4 | 105 |
| 23 | 576-193-5 | HCl-$Na_2B_4O_7$ | 1.28 | 12 | 6.8 | do | 3/4 | 101 |
| 24 | 576-196-3 | HCl-$Na_2B_4O_7$ | 1.31 | 31 | 5.3 | do | 3/4 | 111 |
| 25 | 576-194-7 | HCl-$Na_2B_4O_7$ | 1.31 | 21 | 5.8 | do | 3/4 | 101 |
| 26 | 576-193-3 | HCl-$Na_2B_4O_7$ | 1.44 | 12 | 6.3 | do | 3/4 | 85 |
| 27 | 576-194-3 | HCl-$Na_2B_4O_7$ | 1.47 | 21 | 5.3 | do | 3/4 | 82 |
| 28 | 576-191-7 | HCl-$Na_2B_4O_7$ | 1.7 | 12 | 5.3 | do | 3/4 | 68 |
| 29 | 576-55-2 | $H_3PO_4$-$Na_2B_4O_7$ | 0.14 | 24 | 8.3 | Very poor | 7/16 | 34 |
| 30 | 576-54-8 | $H_3PO_4$-$Na_2B_4O_7$ | 0.44 | 25 | 7.0 | do | 7/16 | 71 |
| 31 | 576-54-2 | $H_3PO_4$-$Na_2B_4O_7$ | 0.80 | 26 | 6.1 | Good | 7/16 | 115 |
| 32 | 576-53-8 | $H_3PO_4$-$Na_2B_4O_7$ | 1.00 | 26 | 5.6 | do | 7/16 | 110 |
| 33 | 576-53-2 | $H_3PO_4$-$Na_2B_4O_7$ | 1.20 | 26 | 5.3 | do | 7/16 | 85 |
| 34 | 576-52-8 | $H_3PO_4$-$Na_2B_4O_7$ | 1.48 | 26 | 4.7 | do | 7/16 | 79 |
| 35 | 576-51-2 | $H_3PO_4$-$Na_2B_4O_7$ | 2.50 | 28 | 2.8 | do | 7/16 | 65 |
| 36 | 576-190-1 | HCl-$[NaBO_2]_2$ | 1.48 | 33 | 6.8 | Fair | 3/4 | 85 |
| 37 | 576-190-5 | HCl-$[NaBO_2]_2$ | 1.55 | 33 | 6.3 | do | 1/2 | 116 |
| 38 | 576-188-1 | HCl-$[NaBO_2]_2$ | 1.55 | 23 | 6.8 | Good | 1/2 | 115 |
| 39 | 576-188-5 | HCl-$[NaBO_2]_2$ | 1.65 | 23 | 6.3 | do | 3/4 | 106 |
| 40 | 576-189-5 | HCl-$[NaBO_2]_2$ | 1.80 | 23 | 5.3 | do | 3/4 | 86 |
| 41 | 576-187-5 | HCl-$[NaBO_2]_2$ | 1.98 | 13 | 5.8 | do | 3/4 | 74 |

[1] Concentration is quoted to the nearest integral number.
[2] Classification of flame-retardant properties:
  Good—Schlyter flamespread 6–15 in. within 10 min. of ignition.
  Fair—Schlyter flamespread 16–25 in. within 10 min. of ignition.
  Very poor—Schlyter flamespread over 25 in. within 5 min. of ignition.
[3] The P.T.S. values refer to a particle board of 0.63 specific gravity.

The results which appear in Tables 1, 2 and 3 will be discussed separately.

*Table I*

The data in this table clearly establish the fact that the chemical system comprising an alkali metal borate acidified with an inorganic acid, is a very effective agent for conferring flame retardance on particle boards. It will be seen from the table that the untreated board had a flamespread in excess of 50 inches, whereas the treated ones showed much lower values. The table shows data on four systems; hydrochloric acid-sodium tetraborate, phosphoric acid-sodium tetraborate, nitric acid-sodium tetraborate, and hydrochloric acid-sodium metaborate, all of which fall under the general classification of alkali metal borates acidified with inorganic acids. Wide variations in ancillary factors, such as the total chemical concentration (which was varied between 12 and 33%), and the acid:alkali metal borate mol. ratio (which was varied between 1.3–1.7), the actual amount of flame-retardant chemicals retained by the final board (ranging from 7–12%) are included in the table, to show the general flexibility of the chemical system.

*Table II*

The data in Table II show an inverse relationship between the solution concentration of the acidified alkali metal borate, represented here by hydrochloric acid-sodium tetraborate, and the flamespread values. The data have been aranged into three groups: the first with 4% flame-retardant chemicals in the finished board, the second and third with about 8% and 11% respectively.

It may be seen that the flame retardance of the finished board bears an inverse relationship to the solution concentration of the flame-retardant chemicals, at any particular level of addition. It is preferred that the solution concentration be less than 40% and it is best to be within the range 6–25%.

One of the most important and useful aspects of the chemical system resides in the fact that a concentration level exists which confers excellent flame retardance on the finished board, without making any undue demands on the overall process of particle board manufacture.

*Table III*

The examples in this table demonstrate the relationship between the acid-alkali metal borate mol. ratio and the physical strength properties of the flame-retardant particle board. The perpendicular tensile strength (henceforth P.T.S.) was chosen to illustrate the strength properties.

Table III shows that a very definite high peak in the P.T.S. values appears at mol. ratios characteristic of each individual acidified borate system. This peak appears at a hydrochloric acid-sodium tetraborate mol. ratio range of 1.0 to 1.5, at a hydrochloric acid-sodium metaborate mol. ratio range of 1.6–1.8, and at a phosphoric acid-sodium tetraborate mol. ratio range of 0.8 to 1.2. Outside these acid alkali metal borate mol. ratio ranges the P.T.S. of the flame-retardant particle board falls below the acceptable standard.

It should be noted that the mol. ratio and the solution concentration uniquely determine the pH of the solution.

We claim:
1. In a process for making flame-retardant particle board from wood flakes the step of applying to such flakes a solution consisting essentially of an aqueous solution of a borate selected from the groups consisting of alkali and alkaline earth metal borates acidified with an inorganic acid, the mol ratio of acid to borate being between 0.5 and 2.5.

2. A process as in claim 1 in which the borate is sodium tetraborate.

3. A process as in claim 1 in which the borate is sodium metaborate.

4. A process as in claim 1 in which the inorganic acid is selected from the group consisting of hydrochloric acid, phosphoric acid and nitric acid.

5. A process as in claim 1, in which the solution has a total chemical concentration of less than 40%.

6. A process as in claim 1, in which the total chemical concentration is within the range of 6 to 25%.

7. A process as in claim 1, in which the pH of the solution is between 4.5 and 8.

8. In a method for making fire retardant particle board from wood flakes the step of applying to such flakes a solution consisting essentially of an aqueous solution of sodium tetraborate acidified with hydrochloric acid and having a mol. ratio range of 1 to 1.5.

9. In a method for making fire-retardant particle board from wood flakes the step of applying to such flakes a solution consisting essentially of an aqueous solution of sodium metaborate acidified with hydrochloric acid and having a mol. ratio range of 1.6 to 1.8.

10. In a method for making fire-retardant particle board from wood flakes the step of applying to such flakes a solution consisting essentially of an aqueous solution of sodium tetraborate acidified with phosphoric acid and having a mol. ratio range of 0.8 to 1.2.

11. A method as in claim 8, in which the total chemical concentration is within the range of 6 to 25%.

12. A flame retardant particle board comprising particles coated with a composition consisting essentially of a borate selected from the group consisting of alkali and alkaline earth metal borates acidified with an inorganic acid the mol ratio of acid to borate being 0.5 to 2.5, and a synthetic resin binder.

References Cited by the Examiner
UNITED STATES PATENTS

| | | | |
|---|---|---|---|
| 1,396,264 | 11/1921 | Di Filippo | 117—147 |
| 1,507,275 | 9/1924 | Duffy | 117—100 |
| 1,942,977 | 1/1934 | Payne | 117—138 |

WILLIAM D. MARTIN, *Primary Examiner.*

T. G. DAVIS, *Assistant Examiner.*